UNITED STATES PATENT OFFICE.

HEINRICH OPPERMANN, OF BERLIN, GERMANY.

PROCESS OF PRODUCING OXIDIZED MILK-ALBUMEN.

SPECIFICATION forming part of Letters Patent No. 704,662, dated July 15, 1902.

Application filed December 26, 1901. Serial No. 87,286. (No specimens.)

*To all whom it may concern:*

Be it known that I, HEINRICH OPPERMANN, a citizen of the German Empire, residing at Berlin, Kingdom of Prussia, Germany, have invented certain new and useful Improvements in Processes of Producing Oxidized Milk-Albumen; and I do hereby declare the following to be a full, clear, and exact description of the invention, such as will enable others skilled in the art to which it appertains to make and use the same.

This invention relates to a process of treating casein so as to form an oxidized milk-albumen; and it consists in treating the casein in such a manner as to produce a soluble compound which is not changed by contact with the air, is antiseptic, and which is suited for coating articles of food for the purpose of preserving them.

In carrying out this invention casein mixed with about fifty per cent. of water is treated with four to eight per cent. of magnesium peroxid. A liquid paste is formed which is further diluted with water, if necessary, and which is then applied as a coating to the articles of food to be preserved in any approved manner. Articles of food treated in this manner are preserved from decomposition and do not become moldy. The paste may be mixed with five to ten per cent. of glycerin and from one to two per cent. of melted cacao-butter before it is applied to the articles of food, if desired, to form a more elastic coating upon the said articles and one which will prevent them from drying up.

The magnesium peroxid may be obtained by any approved process.

What I claim is—

1. A process for making oxidized milk-albumen, which consists in treating casein with magnesium peroxid, substantially as set forth.

2. A process for making oxidized milk-albumen, which consists in mixing casein with water and then treating it with magnesium peroxid, substantially as set forth.

3. A process for making a preservative coating, which consists in treating casein with magnesium peroxid, and adding glycerin and cacao-butter to render the coating more elastic, substantially as set forth.

In testimony whereof I affix my signature in presence of two witnesses.

HEINRICH OPPERMANN.

Witnesses:
HENRY HASPER,
WOLDEMAR HAUPT.